March 12, 1940. E. H. BRAYER 2,193,474
FLUID METERING SYSTEM
Filed Oct. 12, 1939 6 Sheets-Sheet 1

INVENTOR
Edward Harold Brayer
BY
Popp and Popp
ATTORNEYS

March 12, 1940.　　　　E. H. BRAYER　　　　2,193,474
FLUID METERING SYSTEM
Filed Oct. 12, 1939　　　6 Sheets-Sheet 3

INVENTOR
Edward Harold Brayer
BY
Popp and Popp
ATTORNEYS

March 12, 1940.  E. H. BRAYER  2,193,474
FLUID METERING SYSTEM
Filed Oct. 12, 1939  6 Sheets-Sheet 5

INVENTOR
Edward Harold Brayer
BY Popps and Popps
ATTORNEYS

March 12, 1940.  E. H. BRAYER  2,193,474
FLUID METERING SYSTEM
Filed Oct. 12, 1939  6 Sheets-Sheet 6

INVENTOR
Edward Harold Brayer
BY
Popps and Popps
ATTORNEYS

Patented Mar. 12, 1940

2,193,474

UNITED STATES PATENT OFFICE 2,193,474

FLUID METERING SYSTEM

Edward Harold Brayer, Buffalo, N. Y.

Application October 12, 1939, Serial No. 299,135

20 Claims. (Cl. 221—101)

This invention relates to a metering apparatus and more particularly to a liquid metering system of the type shown in my Patents Nos. 2,116,777 and 2,116,778, in which the operator sets the mechanism to deliver a definite quantity of liquid and in which after this quantity of liquid has been delivered the mechanism automatically stops the flow and resets itself to its original condition.

As in my said patents, the invention is not limited to any particular field but has a wide range of uses, for example, in delivering hot asphalt compounds or in gasoline and oil service stations where it would enable the operator to take care of a number of pumps, since after the operator sets each pump to the desired gallonage the delivery of the predetermined amount of fuel or oil and the resetting of the mechanism is automatic. Further, the invention can be readily adapted to self-service gasoline or oil pumps by the addition of a coin controlled mechanism and the invention can also be used in filling containers with a definite volume of liquid and by the addition of further well known automatic mechanisms, such as photocells or timing mechanism, could be adapted to continuously fill containers on a moving conveyer with definite volumes of liquid. The invention can also be employed in connection with the blending of gasolines, lubricants and other liquids, blending being readily accomplished by having one or more meters operating in accordance with the invention and delivering the proper amounts of liquid to be blended through a common discharge. The invention can also obviously be used to measure the charges of water to a concrete mixer.

The principal object of the present invention is to provide such a metering apparatus which has, in addition to the advantages set forth in the above patents, increased accuracy in the delivery of the exact amounts of liquid desired, this being accomplished by providing a valve which is closed in stages so that the final closing of the valve involves the cutting off of a very small flow and which can be done with greater precision than with a valve that is moved from a fully opened to a fully closed position, especially where large flows are involved.

Another object of the invention is to provide a valve of the rotary plug type which can be readily opened and closed, without noise, through a gear connection with a nonreversing motor and the stem of which is adapted to support cams for operating the various switches required in the proper control of the valve.

Another object of the invention is to provide a nonreversing motor for operating the valve which is idle at all times except when the valve is being opened or closed or in its reduced flow position.

Another aim of the invention is to provide a clutch between this motor and the valve which permits the motor to overrun and at the same time provides extreme accuracy in bringing the valve to its three positions, namely, its opened, closed and reduced flow positions.

Another object of the invention is to provide an adjustable switch for bringing the valve to its reduced flow position, this adjustability permitting of varying the amount of liquid delivered at such reduced flow depending upon the operating conditions.

Another purpose of the invention is to provide means for opening and closing the valve by hand without disconnecting any part of the apparatus, this permitting manual control of the valve in the event of any failure in the apparatus or in the supply of current for operating the motors.

Another aim of the invention is to provide apparatus which is completely oil sealed, is simple in construction and operation, which employs small nonreversible motors and which is compact and can be manufactured at low cost.

In common with my aforesaid patents the meter system to which the invention applies comprises an electrically actuated valve for starting and stopping the flow of liquid through a meter and an indicating mechanism which is operatively connected with the meter and is shown as including a differential, one ring gear of which is driven by the meter, the other ring gear of which is driven by a reset motor and the spider of which drives an indicating mechanism. The spider of the differential is also shown as operating a pair of accumulator wheels which in turn control a pair of electrical switches, one of which stops the flow of fluid when the indicator mechanism reaches zero and the other of which is set up to effect energization of the reset motor, this last switch stopping the reset motor when the indicating mechanism reaches the preset position. Means are also provided for adjusting the relation of the accumulator wheels and the recording mechanism to the spider of the differential so that the mechanism can be conveniently set to deliver repeated quantities of liquid in any desired volume.

The invention is primarily concerned with the electrically actuated two stage valve and the means for actuating this valve. In order to secure high accuracy in the delivery of metered amounts of liquid, it has been found desirable to cut off the flow of liquid in stages. To this end the valve shown in the present application comprises a motor driven valve which is controlled so as to be brought first to a partly closed condition and thereby reduce the flow of fluid to a small stream, the valve being thereafter quickly brought to a fully closed condition the moment that the mechanism reaches the predetermined setting. The mechanism forming the subject of the invention also includes means for adjusting the lag between the partially and fully closed position of the valve and an electrically actuated clutch working in combination with the motor driven valve to insure prompt closing of the valve and thereby obtain a high degree of accuracy in securing a delivery of the exact metered quantity of fluid desired.

In the accompanying drawings the liquid to be metered is shown as supplied under pressure from a liquid supply line 15, this liquid passing through a motor driven valve indicated generally at 16 and from this valve the liquid passes through a meter 17 to a discharge pipe 18. The meter 17 can be of any usual and well known construction and is shown as including a vertical shaft 19 which drives the automatic recording and controlling mechanism hereinafter described, and which mechanism is contained within a casing 20.

Figure 3:
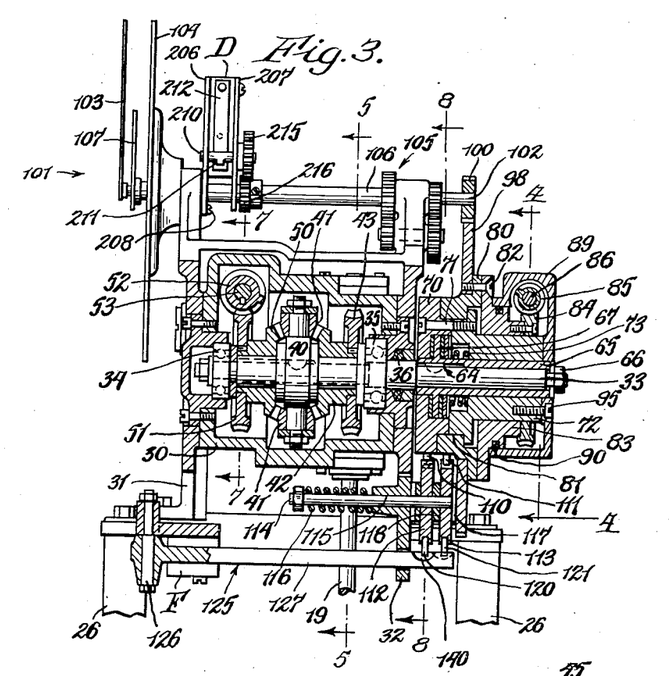
Fig. 3 is a vertical fore and aft section showing the recording and control mechanism, this section being taken on line 3—3, Fig. 1.

This indicating and control mechanism is mounted on posts 26 rising from a spider 27 carried by the casing of the meter 17. The purpose of the posts 26 and spider 27 is to insulate the indicating and control mechanism from the meter 17, this being especially important when high temperature asphalts or the like are being handled by the meter. As best illustrated in Fig. 3, this indicating and control mechanism includes a differential which is adapted to be driven from one side by the metering shaft 19 and from its other side by a reset motor, the spider of this differential driving the recording mechanism and an electrical control mechanism, a fixed relation always being maintained between the recording mechanism and the electric control mechanism but being adjustable with relation to the spider of the differential so that the system can be set to deliver and visually record any desired gallonage. The differential is contained within an enclosing housing 30 which is suitably secured between side members 31 and 32 rising from the posts 26 and includes a main shaft 33 which is journaled at one end in a roller bearing 34 and projects horizontally outward through a roller bearing 35 and stuffing box 36 mounted in the rear wall of the differential housing 30.

Figures 4, 5:
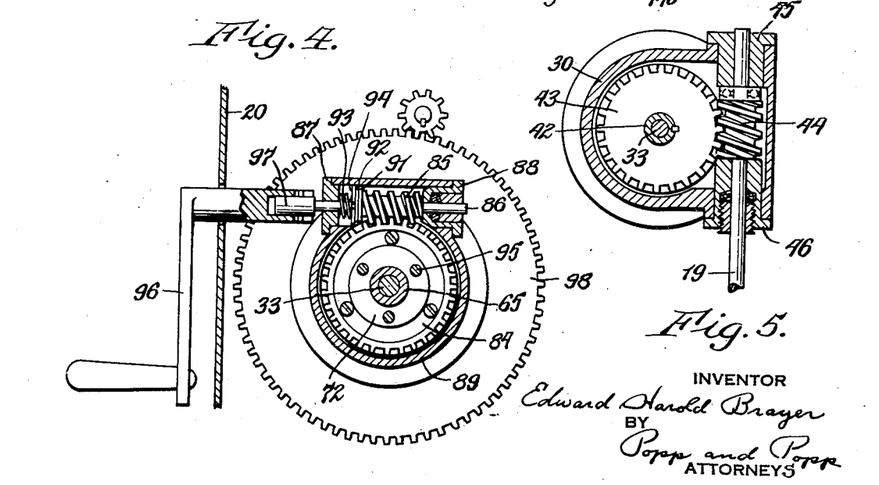
Figs. 4 and 5 are enlarged, fragmentary, vertical, transverse sections, taken on the correspondingly numbered lines on Fig. 3.
Figure 6:
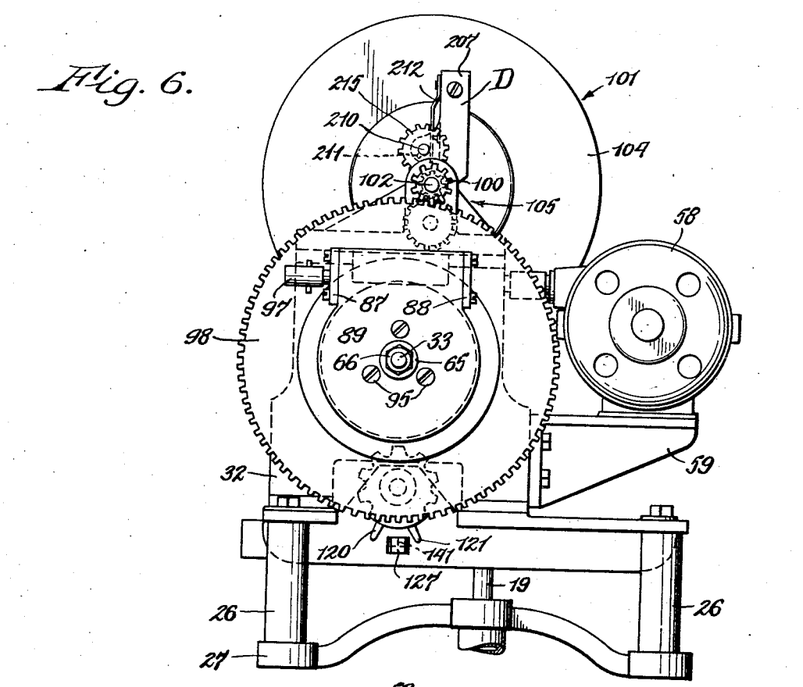
Fig. 6 is a rear elevation of the recording and control mechanism shown in Fig. 3.

To the main shaft is keyed a spider 40 carrying a plurality of pinions 41 which are freely mounted on the spider 40 and rotate on radial axes. At the rear side the pinions 41 are engaged by a ring gear 42 which is rotatably mounted on one end of the rearwardly projecting hub of the spider 40, this ring gear 42 being driven by a worm wheel 43 fixed thereto. This worm wheel 43, as best shown in Fig. 5, is driven by a worm 44 fast to the meter shaft 19, this meter shaft extending vertically and being journaled in bearings 45 and 46.

Figures 7, 8:
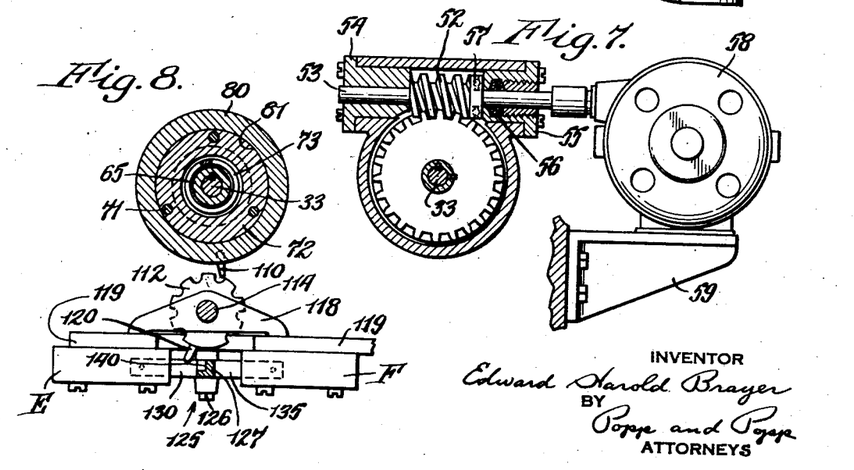
Figs. 7 and 8 are enlarged fragmentary vertical transverse sections, taken on the correspondingly numbered lines on Fig. 3.
Figure 9:
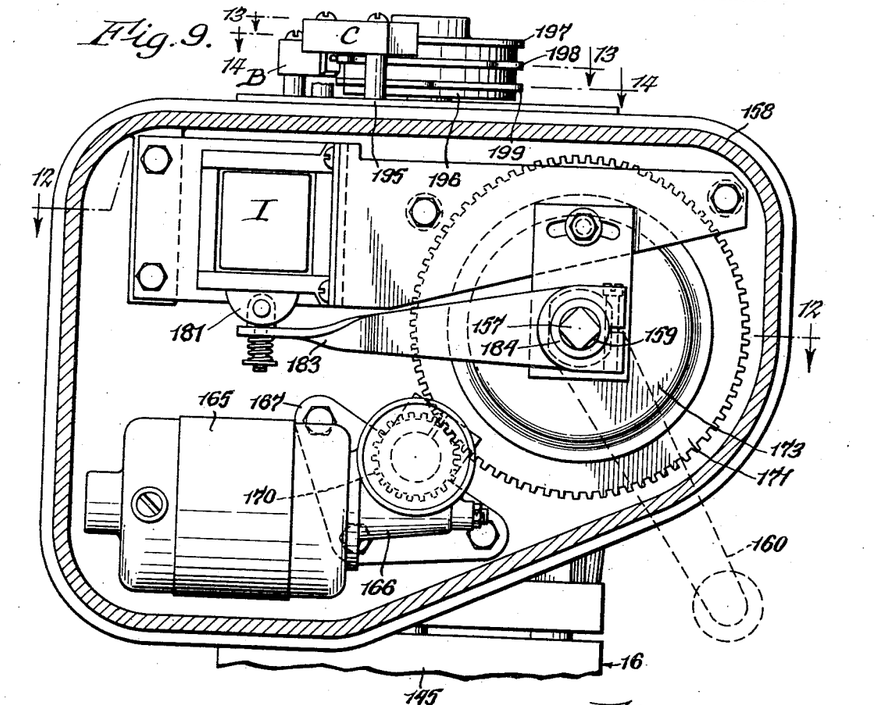
Fig. 9 is an enlarged vertical section, through the housing for the nonreversible valve motor and showing this motor and a part of its drive connection with the rotary plug valve.

The front sides of the pinions 41 are engaged by a ring gear 50 which is rotatably mounted on the forwardly projecting hub of the spider 40 and is driven by a worm wheel 51 fixed to the ring gear 50 in any suitable manner. As best shown in Figs. 3 and 7, this worm wheel is driven by a worm 52 which is fast to a horizontal reset shaft 53, this shaft being suitably journaled in bearings 54 and 55 carried by the differential housing 30. In order to prevent the escape of lubricant, the bearing 55 is preferably provided with a stuffing box 56 and a thrust bearing 57 is also provided between this bearing and the worm 52 to reduce friction. The reset shaft 53 is driven by a reset motor 58 which is shown as being mounted on a stationary supporting bracket 59.

From the above organization it will be seen that the meter 17, through its shaft 19, rotates the differential shaft 33 in one direction and that the reset motor 38, through its shaft 53, rotates the differential shaft 33 in the opposite direction.

That portion of the rear end of the differential shaft 33 surrounded by the stuffing box 36 is enlarged and against the rear shoulder formed by this enlargement a sleeve 65 is held by means of a nut 66 at the rear end of the differential shaft. This sleeve 65 is keyed to the differential shaft 33 so as to turn therewith and at its forward end this sleeve is provided with an outwardly extending flange 67 faced with friction disks to provide a friction clutch 64. The foremost of these friction disks is engaged by a collar 70 which is rotatably mounted on the forward end of the sleeve 65 and is recessed to house the flange 67 and its friction disks. This collar 70 is secured by horizontal screws 71 to an outer collar 72 which is rotatably mounted on the sleeve 65. The collar 72 is recessed at its forward end to house a helical compression spring 73 which urges a washer against the rear friction disk of the clutch 64. It will therefore be seen that the collars 70 and 72 are normally driven in unison with the differential shaft 33 through the friction clutch 64 provided by the flange 67 and its friction disks but that, through this friction clutch 64, the collars 70 and 72 can, as a unit, be rotatably adjusted to this shaft.

The means shown for so adjusting the collars 70 and 72, as a unit relative to the differential shaft 33, comprises a ring 80 rotatably mounted in an annular peripheral groove 81 jointly provided by the sleeves 70 and 72 and secured by means of screws 82 to a ring 83 rotatably mounted on the collar 72. A worm wheel 84 is secured against the outer face of the hing 83 and this worm wheel is engaged by a worm 85 mounted on a normally horizontal shaft 86. This shaft is journaled at its opposite ends, as best shown in Fig. 4, in bearings 87 and 88, these bearings being carried by a housing 89 which encloses the worm wheel 85 and its gear 84 and is preferably filled with a lubricant. To prevent the escape of this lubricant a sealing or packing ring 90 is provided between the ring 83 and the inner part of the gear case 89 as best shown in Fig. 3. In order to prevent the recording apparatus from creeping, a washer 91 is press fitted to the worm shaft 86 and against this washer a fiber washer 92 is pressed by a spring 93, a washer 94 being interposed between the spring 93 and the fiber washer 92 and this last washer being preferably so mounted in the bearing 87 as to be incapable of rotation. The gear housing 89 is fixed to the collar 72 by a plurality of screws 95 so that the worm gear 84 is held in fixed relation to the collars 70 and 72 while the rings 80 and 83 can be rotated relative to these collars 70 and 72 by turning the worm 85.

The shaft 86 on which this worm 85 is mounted is turned by means of a removable crank 96, the hub of which is inserted through an opening in the casing 20 and is formed to interlock with a fitting 97 provided at the end of the worm shaft 86, as best shown in Fig. 4.

The screws 82 which secure the rings 80 and 83 together also secure a gear 98 to the ring 80, as best shown in Fig. 3. This gear 98 drives a pinion 100 of a recording mechanism indicated generally at 101. This pinion 100 is fast to a shaft 102, this shaft carrying a pointer 103 which traverses a dial 104. The shaft 102, through suitable reducing gearing 105, drives a tubular shaft 106 which carries a pointer 107, this pointer also traversing the dial 104. The gearing is such that the pointer 103 completes one revolution of the dial for each unit delivered and the slower moving pointer 107 records the number of units delivered on the dial 104.

Since the collars 70 and 72, through the friction clutch 64, normally rotate with the differential shaft 33 and since the worm gear casing 98 is secured to the collar 72 by the screws 95, it will be seen that the worm 85 journaled in this casing 89 will turn the worm wheel 84 and the rings 83 and 80 connected thereto, thereby driving the gear 98 and the recording mechanism 101 in unison with the differential shaft 33. Since the meter shaft 19 turns this differential shaft 33 in one direction and the reset motor 58 turns this differential shaft in the opposite direction, it will be seen that the meter and reset motor will cause movement of the pointers 103 and 107 in opposite directions. In the device as shown the meter causes the pointer 107 to move from any predetermined setting counterclockwise to zero and the reset motor causes this hand to move from zero back to said predetermined setting by a control mechanism which is preferably constructed as follows:

A counting finger or tooth 110 is mounted to project radially from the collar 70 and a similar counting finger or tooth 111 is mounted to project radially from the ring 80. The finger 110 successively engages the teeth of an accumulator or counting wheel 112 and the finger 111 successively engages the teeth of an accumulator or counting wheel 113 in such manner that each time either of these fingers is rotated a complete revolution, the corresponding accumulator wheel is moved one tooth.

The accumulator wheels 112 and 113 are frictionally mounted on a shaft 114 in any suitable manner. As shown, this frictional mounting for the accumulator wheels is provided by floatingly mounting the shaft 114 in a bearing 115 formed in the rear frame plate 32 and by providing a spring 116 which urges this shaft forwardly. The rear end of the shaft is provided with a head 117 which bears against the rear face of the accumulator wheel 113 and a suitable spacing washer is interposed between the accumulator wheel 112 and the frame plate 32 and a nonrotatable friction plate 118 is loosely interposed between the two accumulator wheels. To provide a simple mounting for the friction plate 118, this plate is provided with a central hole to receive the shaft 114 and its ends are extended to rest on lugs 119 provided on the frame plate 32, as best shown in Fig. 8.

The accumulator wheel 112 carries a zero finger or pin 120 and the other accumulator wheel 113 carries an adjustable finger 121. The zero and adjustable fingers project radially from untoothed portions of their respective accumulator wheels and strike the opposite sides of a horizontal T-shaped switch lever indicated generally at 125. As best shown in Figs. 3 and 8, this switch lever is mounted for rotation about a vertical pin 126 which is carried by the frame and its long arm extends into the paths of the zero and adjustable stop pins 120 and 121. The short arm 130 of the switch lever engages and moves the button of a normally open microswitch E. The other short arm 135 engages and moves the button of a microswitch F which is normally closed with one of its contacts 260 and assumes this condition whenever the T-lever 125 is released by the pins 120, 121. The microswitches E and F are of usual and well known construction and are operated with a very slight inward movement of their buttons. In order to render the switch arm 125 very sensitive in response to engagement by the pins 120, 121, the extreme end of the long arm 127 thereof is cut away on one side to form a central shoulder 140 and is cut away on the other side to form a central shoulder 141. These shoulders 140 and 141 are arranged in the paths of the pins 120 and 121 and are engaged thereby. It will be seen that by this means the movement of the switch arm 125 is very slight because both the zero pin 120 and the adjustable pin 121 engage the switch arm in the same plane and because the microswitches E and F are extremely sensitive to slight movements of the switch arm.

The two stage valve 16 which controls the flow of fluid through the meter is of such design that it can be fully opened, partly opened and closed under a matic control as hereinafter described.

This permits full flow of liquid through the meter when the valve is opened and at the same time permits the valve to be partly closed, and permits a relatively small flow or dribble of the liquid through the meter just before the valve is closed. By this means greater accuracy is obtained as the valve can be moved to cut off the relatively small final flow exactly when the meter reaches the setting of the control mechanism, this being impossible if it were attempted to move the valve immediately from a fully opened to a fully closed position.

For this purpose the valve 16 is preferably of the rotary plug type including a body 145 connected with the flow pipes and provided with an internal conical seat 146 provided with the usual ports. The valve plug 147 is of conical form to fit the seat 146 and is provided with a passage 148 which is preferably of diamond form in cross section and is arranged so as to move into complete or partial register with the ports of the valve body 145 as the plug 146 is rotated.

Figure 12:
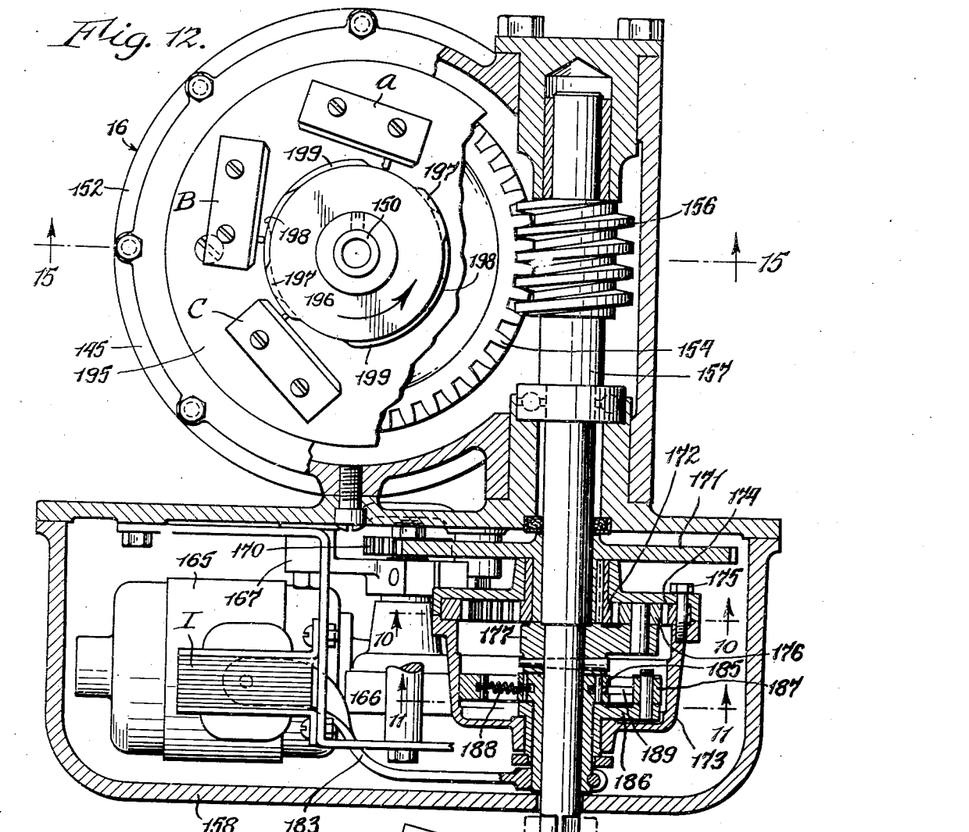
Fig. 12 is a horizontal section, partly in elevation, taken on line 12—12, Fig. 9.
Figure 13:
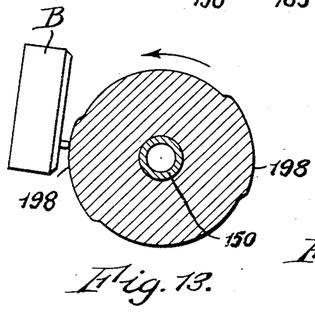
Figs. 13 and 14 are fragmentary horizontal sections, taken on the corresponding lines on Fig. 9.
Figure 15:
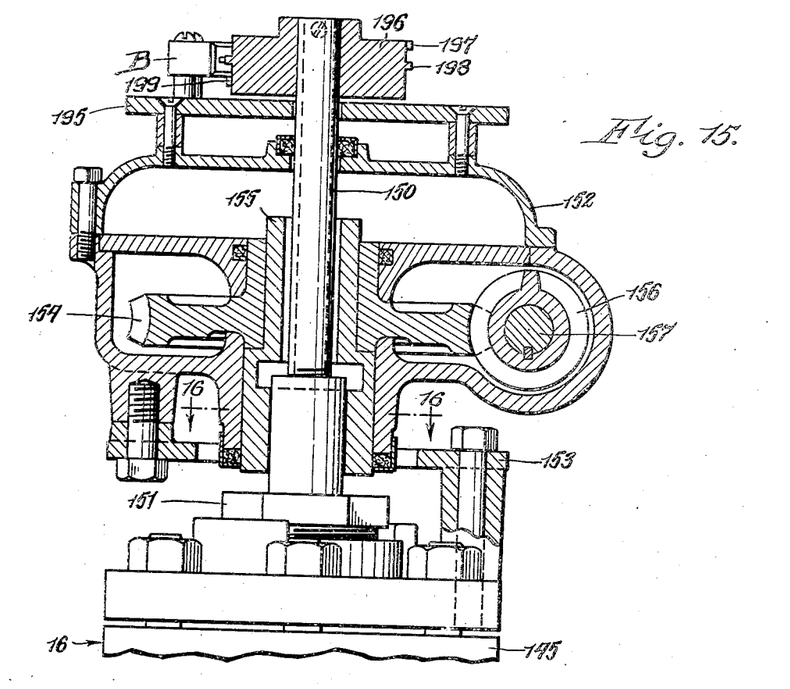
Fig. 15 is a vertical fragmentary section, taken on line 15—15, Fig. 12.
Figure 16:
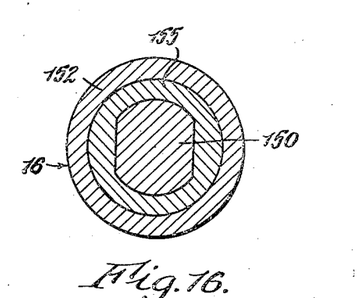
Fig. 16 is a horizontal section, taken on line 16—16, Fig. 15.

The valve plug 147 is so rotated by means of a stem 150 which extends upwardly through the usual stuffing box 151 of the valve body 145 and through a gear case 152, this gear case being preferably secured to the body of the valve 16 by a bracket 153, as best illustrated in Fig. 15. A worm wheel 154 is arranged within this gear casing, this worm wheel being fast to a hub 155 which in turn is keyed to the valve stem 150. The worm wheel 152 is turned by a worm 156 fast to a horizontal shaft 157, which, as best shown in Fig. 12, extends outwardly from the gear case 152 and through a motor housing 158. The motor housing 158 is preferably secured directly to the gear case 152 and the extreme end of the shaft 157 projects forwardly through the front wall of the motor housing 156 and is squared as indicated at 159. The forwardly projected squared end of the worm shaft 157 permits of the application of a crank 160 so that the valve 16 can be opened and closed by hand should this at any time become desirable.

Figure 10:
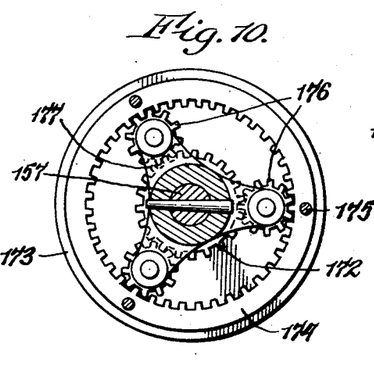
Figs. 10 and 11 are fragmentary vertical transverse sections, taken on the correspondingly numbered lines on Fig. 12.

The worm shaft 157 is turned to open and close the valve 16 by a motor 165 arranged in the motor housing 158. The motor 165 is carried by its gear reduction housing 166, this gear reduction housing 166 being secured to the rear wall of the housing 158 by a bracket 167. The motor, through the gear reduction contained within the housing 166, drives a pinion 170 which in turn drives a gear 171, this gear 171 being rotatably mounted on the worm shaft 157. To the hub of this gear 171 is keyed a pinion 172, on the hub of which is revolvably mounted a planetary gear housing 173. This planetary gear housing carries an internal ring gear 174 which is shown as secured to the planetary gear housing by screws 175. As best illustrated in Figs. 10 and 12, the teeth of the pinion 172 and the internal ring gear 174 are engaged by three pinions 176, these pinions being carried by a spider 177 which is pinned to the worm shaft 157. It will therefore be seen that when the planetary gear case 173 is held stationary, motion from the gear 171 driven by the motor 165 is transmitted through the pinion 172 to the pinions 176 mounted on the spider 177, and since the internal ring gear 174 is held against rotation, the spider 177 will be rotated, causing the worm shaft 157 to rotate and this causing the plug 147 of the valve 16 to be rotated.

Figure 11:
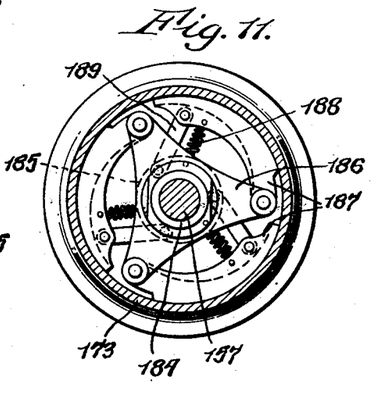

A clutch of the internal brake type is provided for releasably holding the planetary gear case 173 stationary and includes a solenoid I secured within the motor housing 158 and having an armature 181 which is drawn upwardly when the solenoid I is energized. This armature is connected to an arm 183 which is fixed to a bushing 184 rotatably carried at the outer end of the worm shaft 157. The inner end of the bushing 184 is formed to provide a circular grooved head 185 and the bushing 184 also rotatably supports the hub of a spider 186. The arms of the spider 186 pivotally support three brake shoes 187 which are adapted to be expanded outwardly into engagement with the planetary gear housing 173. The brake shoes 187 are normally held in a retracted position by springs 188 which connect the outer end of each shoe with the head 185 of the bushing 184 and the shoes are expanded against the resistance of the springs 188 by tangentially disposed links 189 each of which is pivoted at one end to the end of the corresponding brake shoe 187 and at its other end to a pin 190 on the grooved head 185 of the bushing 184. The links 189 are tangentially arranged so that when the solenoid I is energized and the arm 183 lifted to rotate the bushing 184 clockwise, as viewed in Fig. 11, the links are moved to expand the brake shoes 187 into engagement with the planetary gear housing 173. Since under these conditions the planetary gear housing is held stationary by the solenoid arm 183 it will be seen that a driving connection is established between the motor 165 and the worm shaft 157 through the planetary gearing previously described.

Referring to Figs. 12–15, the end of the valve stem 150 is extended upwardly above the gear case 152 and a platform 195 mounted on this gear case. At its extreme upper end this valve stem carries a circular head 196 which is formed on its periphery to provide an upper pair of salient counterpart cams 197; an intermediate pair of salient counterpart cams 198; and a lower pair of salient counterpart cams 199. The lower counterpart cams 199 are arranged to engage the button of a normally closed microswitch A. The intermediate counterpart cams 198 are arranged to engage the button of a normally closed microswitch B. The upper counterpart cams 197 are arranged to engage the button of a normally closed microswitch C. These cams are arranged in predetermined relation to one another and to the passage 148 in the valve stem 147 to effect the desired sequence of operation as hereinafter described.

An additional switch is provided to initiate the movement of the valve plug 147 to its partly closed position. This switch is in the form of a normally open microswitch D which is shown as mounted on a pair of arms 206 and 207 embracing the tubular drive sleeve 106 of the meter hand 107. The supporting arm 206 is secured to the side frame member 31 of the indicating and control mechanism by a screw 208 which can extend through a slot in this arm so that the arms 206, 207 can be adjustably moved around the shaft 106. The arms 206, 207 also carry a small cam shaft 210, the cam 211 of which is arranged to engage a spring 212 on the microswitch D, this spring engaging the button of this microswitch so as to close the switch when so pressed inwardly by the cam 211. The cam shaft 210 is rotated by a gear 215 which engages a smaller gear 216 fixed to the tubular shaft 106 that carries the indicating hand 107. The relation of the cam 211 to the hand 107 is such that it closes the microswitch D as the hand 107 approaches the zero position on the dial 104, the closing of the switch at this time operating to partially close the valve 16 to its bleeding position.

Figure 1:
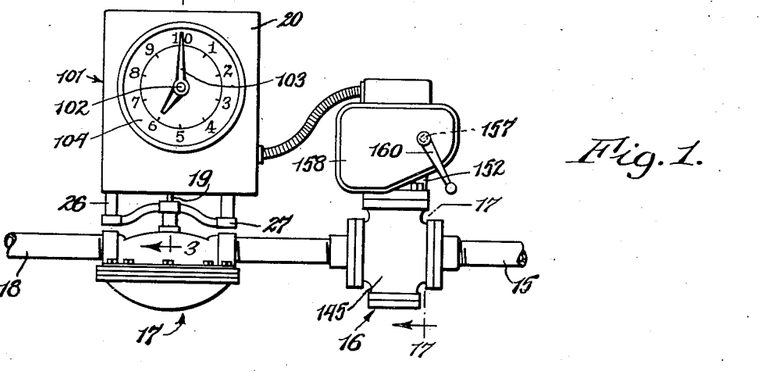
Fig. 1 is a front elevation of a metering system and automatic control and recording mechanism made in accordance with my invention.
Figure 2:
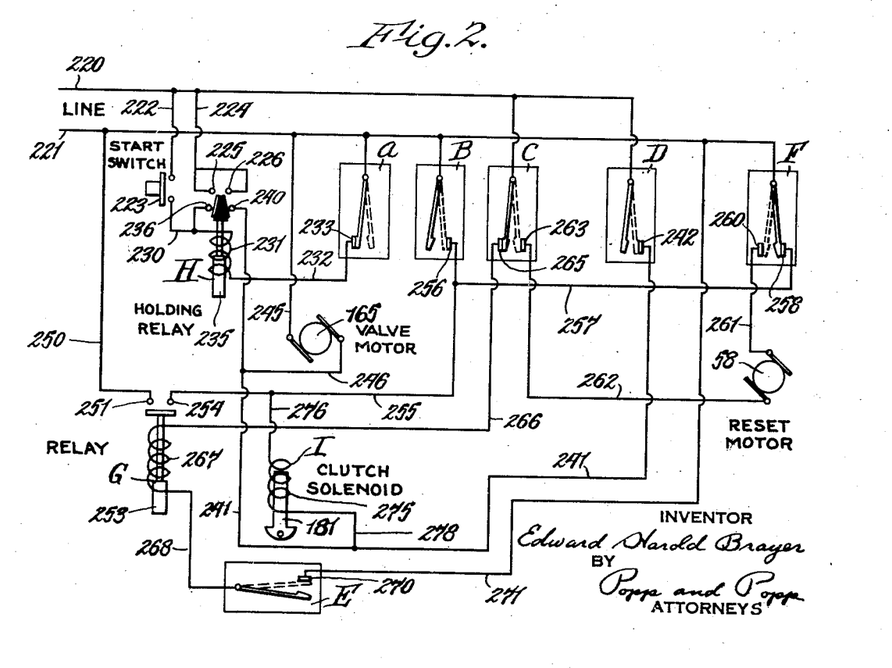
Fig. 2 is a wiring diagram showing the electrical connections between the various parts and showing the condition of the parts preparatory to the pressing of the start button to deliver the preset amount of liquid.

Referring now to the wiring diagram shown in Fig. 2, the power lines 220 and 211 supply alternating current at, say, 110 volts, the power line 220 being connected with the movable contacts of the switches C and D and also through a line 222 with the start switch 223. The power line 220 is also connected by a line 224 with contacts 225, 226 of a holding relay H. The other contact of the start switch 223 is connected by a wire 230 with the winding 231 of the holding relay H, this winding being also connected by a line 232 to the stationary contact 233 of the switch A. The armature 235 of the holding relay H, when the winding 231 is energized, is moved to establish an electric circuit between the contact 225 and a contact 236 connected with the line 230. At the same time the movement of the armature 235, when the holding relay H is energized, establishes a circuit between the contact 226 and a contact 240 at the end of a line 241 leading to the stationary contact 242 of the switch D.

The other power line 221 connects with the movable contacts of the switches A, B and F and is also connected by a line 245 with one side of the valve motor 165, the other side of this motor being connected by a line 246 with the line 241. The power line 221 is also connected by a line 250 with the contact 251 of a holding relay G.

The relay G includes an armature 253 which, when the relay G is energized, establishes a circuit between the contact 251 and a contact 254, this last contact 254 being connected by a line 255 with the stationary contact 256 of the microswitch B. The line 255 is also connected by a line 257 with one of the contacts 258 of the microswitch F. The other stationary contact 260 of the microswitch F is connected by a line 261 with the reset motor 58, the other side of this reset motor being connected by a line 262 with the fixed contact 263 of the microswitch C. The other fixed contact 265 of the microswitch C is connected by a line 266 with the winding 267 of the relay G, the other end of this winding being connected by a line 268 with the movable contact of the microswitch E. The stationary contact 270 of this microswitch E is connected by a line 271 with the main power line 221. The winding 275 of the clutch solenoid I is connected by a line 276 to the line 255 and by a line 278 to the line 241.

*Operation*

Assuming that it is desired to deliver, say, six units of liquid, the operator takes the crank 96, inserts it in the hole in the side of the control mechanism casing 20 and engages it with the fitting 97 of the worm shaft 86. He then rotates the crank 96 until the small hand 107 registers "6" on the dial 104, this being effected through the following mechanism:

The turning of the worm shaft 86 turns the worm 85 (Fig. 4) and worm wheel 84, this worm wheel being secured to the ring 83 (Fig. 5) which is in turn secured to the ring 80 and large gear 98, these rings thereby turning with the worm gear 84. Since the large gear 98 connects with the pinion 100 driving, through the reduced gearing 105, the tubular shaft 106, it will be seen that turning the crank 96 adjusts the pointer 107 carried by the hollow shaft 106 to indicate any desired quantity on the dial 104.

This adjustment of the recording mechanism also effects a corresponding adjustment of the adjustable finger 121. Since the recording device has been adjusted from, say, zero to "6" the rings 80 and 83 have been rotated on the collars 70 and 72 a number of times whereby the pin 111 has moved the accumulator wheel 113 several teeth in a counterclockwise direction, as viewed from the front. The adjustable finger 121 is thereby spaced a predetermined distance from the zero finger 120 on the other accumulator wheel 112, the gap between these fingers determining the volume which is to be delivered. The operator then removes the crank 96.

After the control mechanism has been thus set to the desired position, the system is in condition to deliver successive batches of liquid in the preset amounts by simply pressing the start switch 223 each time the delivery of a batch is desired. At this time the other switches are in the condition illustrated in Fig. 2, the switch A being closed; the switch B being open; the switch C being closed on the left hand contact 265; the switch D being open; the switch E being open and the switch F being closed on the right hand contact 258.

Figure 14:
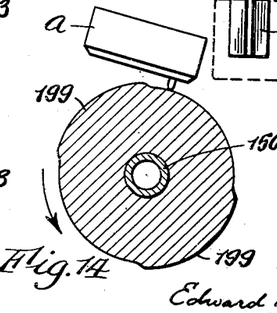

On pressing the button of the start switch 223, a circuit is closed through the holding relay H. This circuit comprises the top side 220 of line, line 222, closed start switch 223, line 230, winding 231 of holding relay H, line 232, and through contact 233 of the closed microswitch A to the other side 221 of line. The normally closed switch A is closed at this line because its button is out of engagement with either of the counterpart cams 199, as illustrated in Fig. 14. The energization of the holding relay H draws its armature up to establish a circuit between the contacts 225 and 236 and between the contacts 226 and 240. The circuit through the contacts 225 and 236 is a holding circuit, this comprising the side 220 of line, line 224, contacts 225 and 236, winding 231 of holding relay H, line 232 and through the closed switch A to the other side 221 of line. The operator can therefore immediately release the button of the start switch 223, the holding relay H being held energized until the switch A is opened.

The energization of the holding relay H, through its other pair of contacts, establishes circuits through the valve motor 165 and the solenoid I of the clutch in the drive between this motor and the valve 16. The circuit so established through the valve motor comprises the side 220 of line, line 224, contacts 226 and 240 connected by the armature of the energized holding relay H, lines 235 and 246, valve motor 165 and line 245 to the other side 221 of line. The circuit through the clutch solenoid I is also established, continuing from the line 235 through lines 241 and 278, winding 275 of clutch solenoid I, lines 276, 255 and 257 through contact 258 of switch F to the lower side of line.

Referring to Figs. 9–12, the energization of the valve motor 165 drives the pinion 170, large gear 171 and central gear 172 in the planetary gear housing 173. The energization of the clutch solenoid H lifts the arm 183 thereby rotating the bushing 184 on the worm shaft 157 to expand the links 189 and move brake shoes 187 into engagement with the planetary gear housing 173. With such engagement of the brake shoes 187, the planetary gear housing 173, together with its internal ring gear 174, is held stationary and as the central pinion 172 is rotating and the ring gear 174 held stationary, the planetary gears 176 meshing with this central pinion and ring gear cause their carrying spider 177 to rotate, thereby rotating the worm shaft 157 to which this spider is pinned. The worm 156 on this worm shaft rotates the worm wheel 154 on the valve stem 150, this rotating the valve plug 147 to open the valve. While the last described circuit, through the fixed contact 258 of switch F, is soon broken through the release of the T-lever by the finger 121, before this occurs the rotation of the valve plug a few degrees releases the pin of normally closed switch B from the operative cam 198 on the valve stem, the clutch solenoid circuit thereby being picked up and continued through the closed switch B instead of F. The energization of both the valve motor 165 and the clutch solenoid H is thereby continued through the switch B until the passage 148 in the valve plug is in full register with the ports in the valve body, this providing maximum flow through the valve 16.

At this point both the valve motor 165 and the solenoid I of the clutch in the drive between it and the valve plug 147 are deenergized so that the valve remains fully open to deliver substantially all of the predetermined batch through the meter 17. The circuit arrangement for so holding the valve fully open includes the normally closed switch A which, when the valve plug 147 reaches its fully opened position, is engaged by one of the counterpart cams 199 mounted on the valve stem. This engagement opens the switch A and hence opens the circuit through the holding relay H, as shown in Fig. 2. As the closed circuits through both the valve motor 165 and the solenoid I of its drive clutch, as just described, depended on the energization of the holding relay H and the connection of its contacts 226 and 240, it will be seen that the deenergization of this holding relay by opening the switch A effects the deenergization of the valve motor 165 and its drive clutch solenoid I, thereby arresting the rotation of the plug 147 of the valve 16 at its fully opened position.

In this fully opened position of the valve 16, the fluid flows through the meter 17, thereby turning the metering shaft 19. The turning of the metering shaft, through the worm 44, drives the worm wheel 43, thereby driving the gear 42. Since the other ring gear 50 is held stationary, the pinions 41 which connect these ring gears, rotate the spider 40 at half the speed of the worm wheel 43 and ring gear 42. The differential shaft 33 is thereby revolved, this shaft, through the sleeve 65 and the friction clutch 64 revolving the entire assembly carried on its projecting end, this assembly including the collars 70 and 72, rings 80 and 83, gear 98, gear casing 89 and the worm gear 84 and worm 85. Therefore during the metering operation the gear 98 rotates the pinion 100 and as this pinion is connected through the shaft 102 and reducing gearing 105 to the tubular shaft 106 carrying the recording hand 107, this recording hand is slowly rotated toward the zero position.

Figure 17:
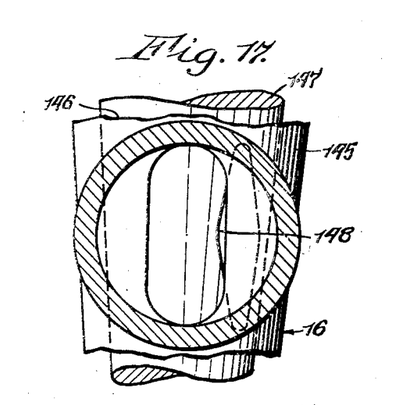
Fig. 17 is an enlarged fragmentary vertical section, taken on line 17—17, Fig. 1 and showing the manner in which the valve plug is brought to a partly closed or dribble position.

The pointer 107 and its tubular shaft 106 is thereby brought back toward its zero position on the dial 104 and just before reaching this position the gears 215, 216 on the shaft 106 (Fig. 3) have turned the cam shaft 210 to the point where its cam 211 closes the normally opened microswitch D. The closing of the switch D, as shown in Fig. 2, establishes a circuit from the top side 220 of line, through closed switch D, lines 241, 278, winding 275 of clutch solenoid I, lines 276 and 255 and through closed switch B to the lower side 221 of line. At the same time this closing of the switch D establishes a circuit through its line 241, line 246, valve motor 165 and through the line 245 to the lower side 221 of line. The energization of both the valve motor 165 and the solenoid I of the clutch in its drive connection with the valve plug 147 rotates the valve plug from its fully opened position, such rotation bringing its passage 148 out of register with the ports of the valve body 145. This closing movement of the valve plug 147 is arrested when the valve plug comes to the position shown in Fig. 17, the arresting of the plug at this point permitting a small amount of liquid to bleed through the meter to make up the predetermined batch.

This arresting of the valve plug at this bleeder position is effected by the switch B. When the valve plug assumes the bleeding position shown in Fig. 17, one of the cams 198 engages the button of the switch B so as to open this normally closed switch. This breaks the circuit through the clutch solenoid I, as just described, and hence the arm 183 (Fig. 9) is permitted to drop, this rotating the bushing 184 (Fig. 12) and releasing the shoes 187 (Fig. 11) from the planetary gear housing 173. This leaves the planetary gear housing 173 free to rotate and since the valve motor 165 is still running its only effect is to rotate the planetary gear housing 173. It will be seen that the friction of the worm shaft 157 and valve plug 147 is substantially greater than the friction in rotating the planetary gear housing 173 and hence the rotating movement of the central pinion 172 of the planetary gear by the motor operates to rotate the ring gear 174 secured to the housing rather than the spider 177 secured to the worm shaft 157. Therefore during the bleeding of valve 16 the valve motor 165 rotates idly.

During the operation of the meter 17, both while the valve 16 is fully opened and also while this valve is in the bleeding position the pins 110 and 111 rotate in unison, thereby advancing both of the accumulator wheels 112 and 113 one tooth for each rotation of the assembly carried by the differential shaft 33. This rotation of the accumulator wheels moves the zero finger 120 toward the T-shaped switch arm 125 and the adjustable finger 121 away from this arm. While the release of the T-arm from the finger 121 immediately permits the switch F to close through its contact 260, this movement, as previously explained, is ineffectual to break the circuit through the clutch solenoid I as the circuit is picked up by the switch B before the circuit through the contact 258 of switch F opens. When the indicating hand 107 reaches zero, the zero figure 120 engages the arm 127 of the switch arm 125 and closes the normally open switch E, the switch F being now closed through its contact 260. When this occurs a circuit is established from the side 221 of line, through line 271, closed switch E, line 268, winding 267 of relay G, line 266 and through closed contact 265 of switch C to the upper side 220 of line.

The energization of relay G moves its armature to close the contacts 251 and 254, this establishing a circuit from the lower side 221 of line, through line 250, closed relay contacts 251, 254, lines 255 and 276, winding 275 of clutch solenoid I, lines 278 and 241 and through the closed switch D to the upper side 220 of line. As the valve motor 165 has been idling and as the energization of the clutch solenoid I establishes a driving connection between this motor and the valve plug 147, as previously described, this energization of the clutch solenoid serves to rotate the valve plug 147 to its fully closed position and hence cut off the flow of liquid through the meter 17.

When the valve plug 147 is fully closed one of the counterpart cams 197 on its stem actuates switch C so as to break the connection between its movable contact and the stationary contact 265 and establish a circuit through its stationary contact 263. As the circuit, through the relay G, as just described, included the closed contact 265 of the switch C it will be seen that so moving the movable contact of the switch C out of engagement with the fixed contact 265 breaks the circuit through the relay G so that its armature is moved out of engagement with the relay contacts 251 and 254. This breaking of the circuit through the contacts 251 and 254 by deenergization of the relay G deenergizes the circuit just described through the clutch solenoid I, and hence breaks the driving connection between the valve motor 165 and the valve plug 147 so that the valve plug is arrested at its closed position.

This closing of the switch C through its contact 263 also energizes the reset motor 58. Thus a circuit is established from side 220 of line, through contact 263 of switch C, line 262, reset motor 58, line 261 and through contact 260 of switch F to the other side of line.

This energization of the reset motor, as best shown in Fig. 3, effects rotation of the worm shaft 58, thereby rotating the worm 52 and the worm wheel 51. This worm wheel is fast to the other ring gear 50 and since the meter has been cut out of operation and hence the ring gear 42 is held stationary, the rotation of the ring gear 50 will rotate the differential shaft 33 in the opposite direction from that provided by the meter and at one-half the speed of the ring gear. The entire assembly carried on the projecting arm of the differential shaft 33 is thereby reversed in its rotation, the gear 98 driving the pointer 170 from zero back to the former setting which was assumed to be "6".

This retrograde movement of the pointer 107 and its shaft 106 from zero to the preset position effects a retrograde movement of the small cam shaft (Fig. 3) which is connected with the pointer shaft 106 by the gears 215 and 216. Within a short time, therefore, the cam releases the spring 212 which in turn releases the button of the normally open switch D. This opening of the switch D breaks the circuit through the valve motor 165 which, as previously explained, was energized through closing this switch D and hence the idling valve motor is brought to rest.

The reset motor 58, in revolving the assembly mounted on the projecting end of the differential shaft 33, revolves the pins 110 and 111 in a reverse direction and on each revolution of the assembly the accumulator wheels 112 and 113 are moved one tooth. This continues, the zero finger 120 moving away from the switch arm 127 and the adjustable finger 121 moving toward this switch arm until the adjustable finger 121 engages the switch arm 127. Since the relation between these two fingers has been set for six units, the adjustable finger 121 will strike the switch arm 127 when "6" is reached by the pointer 107. At this time the adjustable finger 121 throws the switch arm to move the movable contact of the switch F out of engagement with its stationary contact 260 and into engagement with a stationary contact 258. When this occurs the circuit, through the reset motor 58, is broken since one side of the reset motor 58 is connected through the now open contact 260 with one side of the line. The reset motor therefore stops and the entire apparatus comes to rest. The apparatus is at this time in the condition originally assumed so that upon pressing the button of the start switch 223 the cycle of operations just described will be repeated to deliver six units of liquid.

Since the casing 89 for the adjusting worm 85 is held stationary in changing the setting of the apparatus, it will be seen that the worm 85 is always brought back to the horizontal position shown in Fig. 3 at the end of each cycle of operations and hence is in position to permit of resetting the apparatus to deliver any desirable amount of liquid by inserting the crank 96 and turning the worm 85 to effect such resetting as previously described. Further, it will be seen that by the provision of the clutch 64, the differential mechanism can overrun without breaking the fingers 120 or 121, this clutch permitting the differential shaft 33 to overrun at either end of its movement after the fingers 120 or 121 have engaged the switch arm 125. By this means the recording finger 107 is stopped exactly at zero and exactly at the predetermined setting, even though the reset motor 58 and the meter do not stop instantly.

From the foregoing it will be seen that the present invention provides an extremely rugged, simple, compact and inexpensive and accurate metering system in which the amount of liquid to be delivered can be preselected and which will deliver the preselected volume of the liquid and automatically restore the control and indicating mechanism to its preset position ready for another delivery of the same amount of liquid upon pressing the start button. It will also be noted that the accurate delivery of the exact amount of fluid desired is insured by the operation of the valve in two stages, the valve being brought to a partly closed position before being completely closed. It will further be noted that the operation of the valve to so operate in two stages is accomplished by a non-reversible motor and through a clutch by which the operation of the valve can be accurately controlled in spite of the tendency of the valve motor to overrun. It will further be seen that the motor driven valve is quite in operation and is readily controlled through the planetary gearing and brake mechanism shown.

I claim as my invention:

1. In a fluid metering system, metering means, a valve controlling the flow of fluid through said metering means, a motor operatively connected with said valve to open and close the same, a control mechanism driven by said metering means, means actuated by said control mechanism for energizing said motor to partly close said valve when an amount short of a predetermined amount of fluid has been delivered through said metering means, means for arresting said valve at said partly closed position, and means actuated by said control mechanism for completely closing said valve through power derived from said motor when said predetermined amount of fluid has been delivered through said metering means.

2. In a fluid metering system, metering means, a valve controlling the flow of fluid through said metering means, a motor operatively connected with said valve to open and close the same, a control mechanism driven by said metering means, means actuated by said control mechanism for energizing said motor to partly close said valve when an amount short of a predetermined amount of fluid has been delivered through said metering means, means actuated by the movement of said valve for disconnecting said motor and valve to arrest said valve at said partly closed position, and means actuated by said control mechanism for completely closing said valve through power derived from said motor when said predetermined amount of fluid has been delivered through said metering means.

3. In a fluid metering system, metering means, a valve controlling the flow of fluid through said metering means, a motor operatively connected with said valve to open and close the same, a control mechanism driven by said metering means, means actuated by said control mechanism for energizing said motor to partly close said valve when an amount short of a predetermined amount of fluid has been delivered through said metering means, means for arresting said valve at said partly closed position, and means actuated by said control mechanism for completely closing said valve through power derived from said motor when said predetermined amount of fluid has been delivered through said metering means and said control mechanism also including means for selectively varying the said predetermined amount of fluid to be delivered by said metering means.

4. In a fluid metering system, metering means, a valve controlling the flow of fluid through said metering means, a motor operatively connected with said valve to open and close the same, a control mechanism driven by said metering means, means actuated by said control mechanism for energizing said motor to partly close said valve when an amount short of a predetermined amount of fluid has been delivered through said metering means, means for arresting said valve at said partly closed position, means actuated by said control mechanism for completely closing said valve through power derived from said motor and deenergizing said motor when said predetermined amount of fluid has been delivered, and manual means for energizing said motor to open said valve to deliver successive batches of said predetermined amounts of fluid.

5. In a fluid metering system, metering means, a valve controlling the flow of fluid through said metering means, a motor operatively connected with said valve to open and close the same, a control mechanism driven by said metering means, means actuated by said control mechanism for energizing said motor to partly close said valve when an amount short of a predetermined amount of fluid has been delivered through said metering means, means for arresting said valve at said partly closed position, means actuated by said control mechanism for completely closing said valve through power derived from said motor and deenergizing said motor when said predetermined amount of fluid has been delivered, manual means for energizing said motor to open said valve to deliver successive batches of said predetermined amounts of fluid, and means for deenergizing said motor when said valve has been opened.

6. In a fluid metering system, metering means, a rotary plug valve controlling the flow of fluid through said metering means, a motor operatively connected to rotate the plug of said valve, a control mechanism driven by said metering means, means actuated by said control mechanism for energizing said motor to rotate said plug to a partly closed position when an amount short of a predetermined amount of fluid has been delivered through said metering means, means for arresting said valve plug at said partly closed position, and means actuated by said control mechanism for completely closing said plug through power derived from said motor when said predetermined amount of fluid has been delivered by said metering means.

7. In a fluid metering system, metering means, a rotary plug valve controlling the flow of fluid through said metering means, the plug of said valve being provided with a valve stem, cam means on said valve stem, a motor operatively connected with said valve stem to rotate said plug, a control mechanism driven by said metering means, means actuated by said control mechanism for energizing said motor to rotate said plug to a partly closed position when an amount short of a predetermined amount of fluid has been delivered through said metering means, means actuated by said cam means for disconnecting said motor and valve stem to arrest said valve plug at said partly closed position, and means actuated by said control mechanism for completely closing said valve through power derived from said motor when said predetermined amount of fluid has been delivered through said metering means.

8. In a fluid metering system, metering means, a valve controlling the flow of fluid through said metering means, an electric motor operatively connected with said valve to open and close the same, a control mechanism driven by said metering means, a switch for energizing said motor through a circuit including a second switch to move said valve toward is open position, means operating in synchronism with said valve for opening said second switch when said valve reaches its open position to hold said valve open, a third switch in circuit with said motor, means actuated by said control mechanism for closing said third switch when an amount short of a predetermined amount of fluid has been delivered by said metering means to energize said motor through a circuit including a fourth switch and move said valve toward its closed position, means operating in synchronism with said valve for opening said fourth switch before said valve is fully closed, a fifth switch in a circuit arranged to actuate said motor, means actuated by said control mechanism for closing said fifth switch when said metering mechanism has delivered said predetermined amount of fluid to energize said motor through a circuit including a sixth switch to move said valve to its fully closed position, and means actuated in synchronism with said valve for opening said sixth switch to deenergize said motor when said valve reaches its fully closed position.

9. In a fluid metering ssytem, metering means, a valve controlling the flow of fluid through said metering means, an electric motor operatively connected with said valve to open and close the same, a control mechanism driven by said metering means, a switch for ener_izing said motor through a circuit including a second switch to move said valve toward its open position, means operating in synchronism with said valve for opening said second switch when said valve reaches its open position to hold said valve open, a third switch in circuit with said motor, means actuated by said control mechanism for closing said third switch when an amount short of a predetermined amount of fluid has been delivered by said metering means to energize said motor through a circuit including a fourth switch and move said valve toward its closed position, means for adjusting the relation of said third switch to said control mechanism to adjustably vary the preliminary closing of said valve, means operating in synchronism with said valve for opening said fourth switch before said valve is fully closed, a fifth switch in a circuit arranged to actuate said motor, means actuated by said control mechanism for closing said fifth switch when said metering mechanism has delivered said predetermined amount of fluid to energize said motor through a circuit including a sixth switch to move said valve to its fully closed position, and means actuated in synchronism with said valve for opening said sixth switch to deenergize said motor when said valve reaches its fully closed position.

10. In a fluid metering system, metering means, a valve controlling the flow of fluid through said metering means, an electric motor operatively connected with said valve to open and close the same, a clutch included in the drive between said motor and valve, a control mechanism driven by said metering means, means actuated by said control mechanism for energizing said motor and closing said clutch to partly close said valve when an amount short of a predetermined amount of fluid has been delivered through said metering means, means for opening said clutch to arrest said valve at said partly closed position, means actuated by said control mechanism for closing said clutch to complete the closing of said valve when said predetermined amount of fluid has been delivered through said metering means, means for opening said clutch when said valve has closed and means for subsequently deenergizing said motor.

11. In a fluid metering system, metering means, a valve controlling the flow of fluid through said metering means, an electric motor operatively connected with said valve to open and close the same, a clutch included in the drive between said motor and valve, a control mechanism driven by said metering means, means actuated by said control mechanism for energizing said motor and closing said clutch to partly close said valve when an amount short of a predetermined amount of fluid has been delivered through said metering means, means actuated in synchronism with said valve for opening said clutch to arrest said valve at said partly closed position, means actuated by said control mechanism for closing said clutch to complete the closing of said valve when said predetermined amount of fluid has been delivered through said metering means, means actuated in synchronism with said valve for opening said clutch when said valve has closed and means actuated by said control mechanism for subsequently deenergizing said motor.

12. In a fluid metering system, metering means, a rotary plug valve controlling the flow of fluid through said metering means, an electric motor operatively connected to rotate the plug of said valve and open and close the same, a clutch included in the drive between said motor and plug, a control mechanism driven by said metering means, switch means actuated by said control mechanism for energizing said motor and closing said clutch to rotate said plug to a partly closed position when an amount short of a predetermined amount of fluid has been delivered through said metering means, switch means actuated in synchronism with said plug for opening said clutch to arrest said plug at said partly closed position, switch means actuated by said control mechanism for closing said clutch to complete the closing of said plug when said predetermined amount of fluid has been delivered through said metering means, switch means actuated in synchronism with said plug for opening said clutch when said plug has been closed and switch means actuated by said control mechanism for subsequently deenergizing said motor.

13. In a fluid metering system, metering means, a valve controlling the flow of fluid through said metering means, an electric motor operatively connected with said valve to open and close the same, a clutch included in the drive between said motor and valve, a solenoid operatively connected with said clutch to close said clutch when energized, a control mechanism driven by said metering means, switch means actuated by said control mechanism for energizing said motor and solenoid to partly close said valve when an amount short of a predetermined amount of fluid has been delivered through said metering means, switch means actuated in synchronism with said valve for deenergizing said solenoid to arrest said valve at said partly closed position, switch means actuated by said control mechanism for energizing said solenoid to complete the closing of said valve when said predetermined amount of fluid has been delivered through said metering means, switch means for deenergizing said solenoid when said valve has closed, and means actuated by said control mechanism for subsequently deenergizing said motor.

14. In a fluid metering system, metering means, a valve controlling the flow of fluid through said metering means, an electric motor operatively connected with said valve to open and close the same, a clutch included in the drive between said motor and valve, a solenoid operatively connected with said clutch to close said clutch when energized, a control mechanism driven by said metering means, a switch for energizing said motor and solenoid through a circuit including a second switch to move said valve toward its open position, means operating in synchronism with said valve for opening said second switch when said valve reaches its open position to hold said valve open, a third switch in circuit with said motor and solenoid, means actuated by said control mechanism for closing said third switch when an amount short of a predetermined amount of fluid has been delivered through said metering means to energize said motor and solenoid through a circuit including a fourth switch to move said valve toward its closed position, means operating in synchronism with said valve for opening said fourth switch before said valve is fully closed, a fifth switch in a circuit arranged to energize said solenoid, means actuated by said control mechanism for closing said fifth switch when said metering mechanism has delivered said predetermined amount of fluid to energize said solenoid through a circuit including a sixth switch to move said valve to its fully closed position, means actuated in synchronism with said valve for opening said sixth switch to deenergize said solenoid when said valve reaches its fully closed position, and means for subsequently deenergizing said motor.

15. In a fluid metering system, metering means, a valve controlling the flow of fluid through said metering means, an electric motor operatively connected with said valve to open and close the same, a clutch included in the drive between said motor and valve, a solenoid operatively connected with said clutch to close said clutch when energized, a control mechanism driven by said metering means, a switch for energizing said motor and solenoid through a circuit including a second switch to move said valve toward its open position, means for maintaining said circuit through said first and second switches until broken by the opening of said second switch, means operating in synchronism with said valve for opening said second switch when said valve reaches its open position to hold said valve open, a third switch in circuit with said motor and solenoid, means actuated by said control mechanism for closing said third switch when an amount short of a predetermined amount of fluid has been delivered through said metering means to energize said motor and solenoid through a circuit including a fourth switch to move said valve toward its closed position, means operating in synchronism with said valve for opening said fourth switch before said valve is fully closed, a fifth switch in a circuit arranged to energize said solenoid, means actuated by said control mechanism for closing said fifth switch when said metering mechanism has delivered said predetermined amount of fluid to energize said solenoid through a circuit including a sixth switch to move said valve to its fully closed position, means actuated in synchronism with said valve for opening said sixth switch to deenergize said solenoid when said valve reaches its fully closed position, and means for subsequently deenergizing said motor.

16. In a fluid metering system, metering means, a valve controlling the flow of fluid through said metering means, an electric motor operatively connected with said valve to open and close the same, a clutch included in the drive between said motor and valve, a solenoid operatively connected with said clutch to close said clutch when energized, a control mechanism driven by said metering means, a switch for energizing said motor and solenoid to move said valve toward its open position and through a circuit including a second switch, means operating in synchronism with said valve for opening said second switch when said valve reaches its open position to hold said valve open, a third switch in circuit with said motor and solenoid, means actuated by said control mechanism for closing said third switch when an amount short of a predetermined amount of fluid has been delivered through said metering means to energize said motor and solenoid through a circuit including a fourth switch and move said valve toward its closed position, means operating in synchronism with said valve for opening said fourth switch before said valve is fully closed, a fifth switch in circuit with a relay the contacts of which are in circuit with said solenoid and third switch, means actuated by said control mechanism for closing said fifth switch when said metering mechanism has delivered said predetermined amount of fluid to energize said relay through a circuit including a sixth switch, the energization of said relay supplying current to said solenoid to close said clutch and effect movement of said valve to its closed position, means actuated in synchronism with said valve for opening said sixth switch to deenergize said solenoid when said valve reaches its fully closed position, and means actuated by said control mechanism for subsequently opening said third switch to deenergize said motor.

17. In a fluid metering system, metering means, a valve controlling the flow of fluid through said metering means, an electric motor operatively connected with said valve to open and close the same, a control mechanism driven by said metering means, a switch for energizing said motor through a circuit including a second switch to move said valve toward its open position, means operating in synchronism with said valve for opening said second switch when said valve reaches its open position to hold said valve open, a third switch in circuit with said motor, means actuated by said control mechanism for closing said third switch when an amount short of a predetermined amount of fluid has been delivered by said metering means to energize said motor through a circuit including a fourth switch and move said valve toward its closed position, means operating in synchronism with said valve for opening said fourth switch before said valve is fully closed, a fifth switch in a circuit arranged to actuate said motor, means actuated by said control mechanism for closing said fifth switch when said metering mechanism has delivered said predetermined amount of fluid to energize said motor through a circuit including a sixth switch to move said valve to its fully closed position, means actuated in synchronism with said valve for opening said sixth switch to deenergize said motor when said valve reaches its fully closed position, a reset motor for returning said control mechanism to its original condition, means for energizing said reset motor upon the opening of said sixth switch, and means for deenergizing said reset motor when said control mechanism is returned to its original condition.

18. In a fluid metering system, metering means, a valve controlling the flow of fluid through said metering means, an electric motor operatively connected with said valve to open and close the same, a control mechanism driven by said metering means, a switch for energizing said motor through a circuit including a second switch to move said valve toward its open position, means operating in synchronism with said valve for opening said second switch when said valve reaches its open position to hold said valve open, a third switch in circuit with said motor, means actuated by said control mechanism for closing said third switch when an amount short of a predetermined amount of fluid has been delivered by said metering means to energize said motor through a circuit including a fourth switch and move said valve toward its closed position, means operating in synchronism with said valve for opening said fourth switch before said valve is fully closed, a fifth switch in a circuit arranged to actuate said motor, means actuated by said control mechanism for closing said fifth switch when said metering mechanism has delivered said predetermined amount of fluid to energize said motor through a circuit including a sixth switch to move said valve to its fully closed position, means actuated in synchronism with said valve for opening said sixth switch to deenergize said motor when said valve reaches its fully closed position, a reset motor for returning said control mechanism to its original condition, means actuated in synchronism with said valve for energizing said reset motor upon the opening of said sixth switch and means actuated by said control mechanism for deenergizing said reset motor when said control mechanism is returned to its original condition.

19. In a fluid metering system, metering means, a valve controlling the flow of fluid through said metering means, an electric motor operatively connected with said valve to open and close the same, a clutch included in the drive between said motor and valve, a solenoid operatively connected with said clutch to close said clutch when energized, a control mechanism driven by said metering means, a switch for energizing said motor and solenoid through a circuit including a second switch to move said valve toward its open position, means operating in synchronism with said valve for opening said second switch when said valve reaches its open position to hold said valve open, a third switch in circuit with said motor and solenoid, means actuated by said control mechanism for closing said third switch when an amount short of a predetermined amount of fluid has been delivered through said metering means to energize said motor and solenoid through a circuit including a fourth switch to move said valve toward its closed position, means operating in synchronism with said valve for opening said fourth switch before said valve is fully closed, a fifth switch in a circuit arranged to energize said solenoid, means actuated by said control mechanism for closing said fifth switch when said metering mechanism has delivered said predetermined amount of fluid to energize said solenoid through a circuit including a sixth switch to move said valve to its fully closed position, means actuated in synchronism with said valve for opening said sixth switch to deenergize said solenoid when said valve reaches its fully closed position, means for subsequently deenergizing said motor, a reset motor for returning said control mechanism to its original condition, means included in said sixth switch for energizing said reset motor when said sixth switch is so opened through a circuit including a seventh switch and means actuated by said control mechanism for opening said seventh switch when said control mechanism is returned to its original condition.

20. In a fluid metering system, metering means, a rotary plug valve controlling the flow of fluid through said metering means, a motor operatively connected to rotate the plug of said valve, a clutch in the drive between said motor and valve and including a driving part permanently coupled with said motor, a driven shaft, permanently coupled with said valve plug, a pinion rotatably mounted on said driven shaft and permanently coupled with said driving part, a housing rotatably mounted on said driven shaft and carrying an internal ring gear, a spider permanently connected to said driven shaft and carrying pinions meshing with said first pinion and internal ring gear and brake means for holding said casing against rotation, a control mechanism driven by said metering means, means actuated by said control mechanism for energizing said motor and applying said brake means to partly close said plug when an amount short of a predetermined amount of fluid has been delivered by said metering means, means for releasing said brake means to arrest said valve plug at said partly closed position, means actuated by said control mechanism for reapplying said brake means when said predetermined amount of fluid has been delivered through said metering means, means for releasing said brake means when said valve plug has closed, and means for subsequently deenergizing said motor.

EDWARD HAROLD BRAYER.